United States Patent
Kristensen

(10) Patent No.: US 8,191,316 B2
(45) Date of Patent: Jun. 5, 2012

(54) OFF-SHORE WIND TURBINE AND METHOD OF ERECTING A WIND TURBINE TOWER

(75) Inventor: Jonas Kristensen, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 147 days.

(21) Appl. No.: 12/623,853

(22) Filed: Nov. 23, 2009

(65) Prior Publication Data

US 2010/0129162 A1    May 27, 2010

Related U.S. Application Data

(60) Provisional application No. 61/117,323, filed on Nov. 24, 2008.

(30) Foreign Application Priority Data

Nov. 24, 2008   (DK) ................................ 2008 01651

(51) Int. Cl.
*E04H 12/00* (2006.01)
(52) U.S. Cl. ........................................ 52/40; 52/651.01
(58) Field of Classification Search .............. 52/40, 148, 52/651.01; 290/44; 212/347; 416/142
See application file for complete search history.

(56) References Cited

U.S. PATENT DOCUMENTS

| | | | | |
|---|---|---|---|---|
| 2,705,061 A | * | 3/1955 | Getz | ................................ 52/114 |
| 3,110,368 A | * | 11/1963 | Ross | ................................ 52/148 |
| 5,062,765 A | | 11/1991 | McConachy | |
| 5,252,029 A | | 10/1993 | Barnes | |
| 6,364,609 B1 | * | 4/2002 | Barnes | ........................... 416/142 |
| 6,903,705 B2 | * | 6/2005 | Livadiotti | ...................... 343/890 |
| 7,198,453 B2 | | 4/2007 | Hall | |
| 7,617,943 B2 | * | 11/2009 | Willim | ............................ 212/347 |
| 2005/0163616 A1 | * | 7/2005 | Mortensen | ................. 416/132 B |
| 2007/0243063 A1 | | 10/2007 | Schellstede | |

FOREIGN PATENT DOCUMENTS

| | | |
|---|---|---|
| EP | 1 316 656 | 6/2003 |
| EP | 1 691 073 | 8/2006 |
| EP | 1 741 928 | 1/2007 |
| GB | 2 344 843 | 6/2000 |
| JP | 2002097651 | 4/2002 |
| WO | 03/001009 | 1/2003 |
| WO | 03/080939 | 10/2003 |

OTHER PUBLICATIONS vattenfall.com—Kentish Flats—archived website (Jun. 9, 2008).*
Tanja Hüsermann-Güntzel; Office Action issued in related Denmark Patent Application No. PA 2008 01651; Jul. 9, 2009; 4 pages; Denmark Patent and Trademark Office.

* cited by examiner

*Primary Examiner* — Jeanette E Chapman
*Assistant Examiner* — Daniel Kenny
(74) *Attorney, Agent, or Firm* — Wood, Herron & Evans, LLP

(57) ABSTRACT

An off-shore wind turbine includes a tower, a pile forming at least part of a foundation carrying the tower, a radial distance element extending outward from the tower and the pile, and a plurality of connecting elements extending from the radial distance element to at least one of the tower and pile, the plurality of connecting elements being configured to vertically align the tower on the pile. A method of erecting the wind turbine tower is also disclosed.

20 Claims, 2 Drawing Sheets

OFF-SHORE WIND TURBINE AND METHOD OF ERECTING A WIND TURBINE TOWER

CROSS-REFERENCE TO RELATED APPLICATIONS

This application claims priority under 35 U.S.C. §119(a) to DK Application No. PA 2008 01651, filed Nov. 24, 2008. This application also claims the benefit of U.S. Provisional Application No. 61/117,323, filed Nov. 24, 2008.

TECHNICAL FIELD

The present invention generally relates to an off-shore wind turbine comprising a pile and a tower, the pile forming part of a foundation carrying the tower. The present invention further relates to a method of erecting a wind turbine tower.

BACKGROUND

Off-shore wind turbines often comprise a pile, such as a mono-pile, which is anchored to the seabed, e.g. by being driven down into the seabed or by being held in place by a structure standing on the seabed. This mono-pile, possibly together with other structures affiliated with it, forms a foundation for a wind turbine tower to be erected thereon.

Often, the mono-pile is not connected directly to the tower since there might be a small angular difference in the axial direction between the tower sections and the mono-pile. Any angular difference is corrected by using a transition piece between the lower end of the tower and the top of the mono-pile. Using such a transition piece and positioning it correctly in order to vertically align the tower may take considerable effort and time and there is also a risk that the tower will have to be re-erected if the transition piece is incorrectly positioned, thus increasing the cost of off-shore wind turbine assembly.

SUMMARY

In view of the above, an objective of the invention is to provide an off-shore wind turbine which may be more easily erected to vertical alignment, as well as to provide a method for more easily erecting an off-shore wind turbine tower to vertical alignment.

According to one aspect, the present invention relates to an off-shore wind turbine comprising: a tower, a pile forming at least part of a foundation carrying the tower, a radial distance element extending outward from the tower and the pile, and a plurality of connecting elements extending from the radial distance element to at least one of the tower and pile, the plurality of connecting elements being configured to vertically align the tower on the pile.

By a radial distance element, each of the connecting elements may be spaced from the tower and/or pile, respectively, between the position of the radial distance element and the position on the tower to which position the connecting element extends and/or the position on the pile to which position the connecting element extends. This spacing facilitates supporting the tower against horizontal forces to which it is subjected, and vertically aligning the tower, holding the tower in a vertical position.

By a plurality of connecting elements extending from the radial distance element to at least one of the tower and the pile, the tower may be vertically aligned and supported by these connecting elements rather than by a transition piece. Thus, the connecting elements may extend from the radial distance element to either the tower or the pile, or to both the tower and the pile, for aligning the tower on the pile. If, for example, the radial distance element is fixed to the pile, the plurality of connecting elements may align the tower by only extending from the radial distance element to the tower, and if the radial distance element is fixed to the tower, the plurality of connecting elements may align the tower by only extending from the radial distance element to the pile. If, on the other hand, the connecting elements extend to both the tower and the pile, the radial distance element may not need to be stronger than needed for distancing the connecting elements from the tower and the pile. Those skilled in the art will appreciate that other designs within this aspect of the invention are possible also.

Further, the connecting elements may support the tower in horizontal directions, i.e., preventing the wind turbine tower from tipping and falling off the pile or from breaking, reducing the requirements for the connection between the tower and the pile to support the tower against horizontal forces, e.g., from wind. Thus, the connection may be made weaker, possibly even being reduced to the connection brought about by gravity and the friction between a top surface of the pile and a bottom surface of the tower, although it may still be convenient to connect the tower to the pile via, for example, a lap-joint, a universal joint or a flange.

Also, the bottom part of the tower and the top part of the pile may be allowed to have a smaller circumference than would be needed if there were no connecting elements supporting the wind turbine tower against part or all of the horizontal forces affecting the wind turbine. Thus, less material is needed and the bulk and weight of the tower and pile may be reduced, saving money.

It may be convenient to allow at least some of the connecting elements to be elongated connecting elements in the inventive wind turbine. Thus, the elongated connecting elements may extend from the radial distance element to the tower and or to the pile. Such elongated connecting elements may take up less space, be lighter and be more easily adjusted, for example, in respect of positioning and length. The connecting elements may thus be chosen from the group of connecting element types consisting of wires, chains, ropes, bars, poles and stakes or a combination thereof. A connecting element may be a combination of two or more of the listed types, such as, for example, a string of bars interconnected by intermittent chains, or a connecting element may be of only one type such as a wire, or a plurality of wires either longitudinally aligned or side by side. All the connecting elements supporting the tower may be similar in type, or combination of types, or they may be different such that, for example, some connecting elements are of one type or combination of types and others are of a different type or combination of types. Specifically, it may be convenient to allow at least some of the connecting elements to be elongated elements having a first section extending from the radial distance element to the tower and a second section extending from the radial distance element to the pile.

Regardless of whether a connecting element is a combination of different types or not, it may be convenient to allow the connecting element to comprise a plurality of exchangeable segments connected to each other to form a string of, for example, wire segments. An advantage of such a connecting element is that segments of the element may be individually replaced, without having to replace other segments of the connecting element. It is, for instance, known that a steel element extending from below a water surface to above the water surface is more susceptible to corrosion at the part of the element which is in the splash zone at the surface, where both water, possibly salt water, and oxygen from air is in abundance than it is at parts of the element which are either always in the water or always in the air. Thus, if the element is segmented, the segment in the splash zone may be replaced due to corrosion without having to replace other segments which are not as corroded.

It may be convenient to allow the connecting elements, or at least one of the connecting elements, to slidably bear against the radial distance element. This implies that the connecting element need not be fastened to the radial distance element. Thus, there is no need for a fastening means arranged either on the connecting element or on the radial distance element, simplifying the construction. Also, the connecting element may be tightened or moved without necessarily moving the radial distance element. The connecting element may, for example, bear against the radial distance element via pulleys of the radial distance element, allowing the connecting element to move longitudinally without chafing against the radial distance element.

A connecting element may extend from the radial distance element to both the tower and the pile, slidably bearing against the radial distance element, but also a connecting element only extending from the radial distance element to either the tower or to the pile may be arranged to slidably bear against the radial distance element, possibly via a pulley. For instance, a connecting element, for example, a wire or a chain, may be fastened to the tower or the pile at both ends of the connecting element via, for example, a pulley of the radial distance element. Thus, a connecting element, for example, in the form of a wire, may be fastened to the tower at one wire end, extend down to the radial distance element where it cooperates with a pulley and then extend back up to the tower where it is fastened at the other wire end. Both wire ends may be fastened at essentially the same place of the tower or they may be fastened at different places of the tower, such as at different vertical positions of the tower. Analogously, both ends of a connecting element may be fastened to the pile.

Alternatively, it may be convenient to fix the connecting elements, or at least one of the connecting elements, to the radial distance element. Thus, the connecting element may also help support the radial distance element, keeping the radial distance element in place and possibly allowing it to carry a higher weight of, for example, a component of the wind turbine or a craftsman. Fixing the connecting element to the radial distance element may also help keep the connecting element in place. Thus, the overall structure of the wind turbine may be more rigid.

The plurality of connecting elements may comprise a plurality of upper connecting elements extending from the radial distance element to the tower and a plurality of lower connecting elements extending from the radial distance element to the pile.

Regardless of whether the connecting elements are fixed to or bear against the radial distance element, it might be convenient to allow the connecting elements, or at least one of the connecting elements, to extend from a periphery of the radial distance element. Thus, the size and weight of the radial distance element may be kept down while still sufficiently spacing the connecting element away from the longitudinal axis of the tower and/or the pile. This may save production and transportation costs, as well as facilitate mounting, in respect of the radial distance element. Of course, in certain circumstances it may be convenient to allow the radial distance element to radially extend beyond the connecting elements, or at least one of the connecting elements, if, for example, the radial distance element has an additional use such as carrying a craftsman or a component of the wind turbine.

The connecting elements, or at least one of the connecting elements, may be arranged to be adjusted in size and/or shape to better support the tower and adjust the tower to a vertical position. The connecting element may, for example, comprise a rigging screw, if the connecting element is of a type such as a wire or chain which enables the use of a rigging screw, allowing the connecting element to be tightened to hold the tower firmly in place.

For the connecting elements to support the tower as efficiently as possible, it may be convenient to allow the connecting elements to be spaced the furthest away from the central vertical axis of the tower and pile at the transition between the pile and the tower. Thus, the radial distance element may be positioned in proximity of the transition between the pile and the tower.

The radial distance element may be of any shape that allows spacing of the connecting elements from the tower and pile, such as, for example, radially extending discrete bars, but it may be convenient to design the radial distance element in the form of a platform. This implies that the radial distance element may have the additional function of carrying components or personnel if needed, for example, during service. A platform may also facilitate access to a tower door for allowing personnel to enter into the tower, if the tower is hollow and provided with such a door.

According to another aspect, the present invention relates to a method of erecting a tower of an off-shore wind turbine, the method comprising: providing a pile, said pile forming part of a foundation; mounting the tower on the pile; providing a radial distance element in proximity of a transition between the pile and the tower; extending a plurality of connecting elements from the radial distance element to at least one of the tower and the pile; and tensioning said plurality of connecting elements for vertical alignment and support of the tower.

The extending of the plurality of connecting elements may comprise extending elongated connecting elements from the radial distance element to both the tower and the pile. Each connecting element may thus be extended from the radial distance element to both the tower and the pile.

Alternatively, the extending of the plurality of connecting elements may comprise extending a plurality of upper connecting elements from the radial distance element to the tower and a plurality lower of connecting elements from the radial distance element to the pile.

The discussion above in respect of the inventive off-shore wind turbine is in applicable parts also relevant to the inventive method. Reference is made to that discussion.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawing, where the same reference numerals will be used for similar elements, wherein.

DETAILED DESCRIPTION

Figure 1:
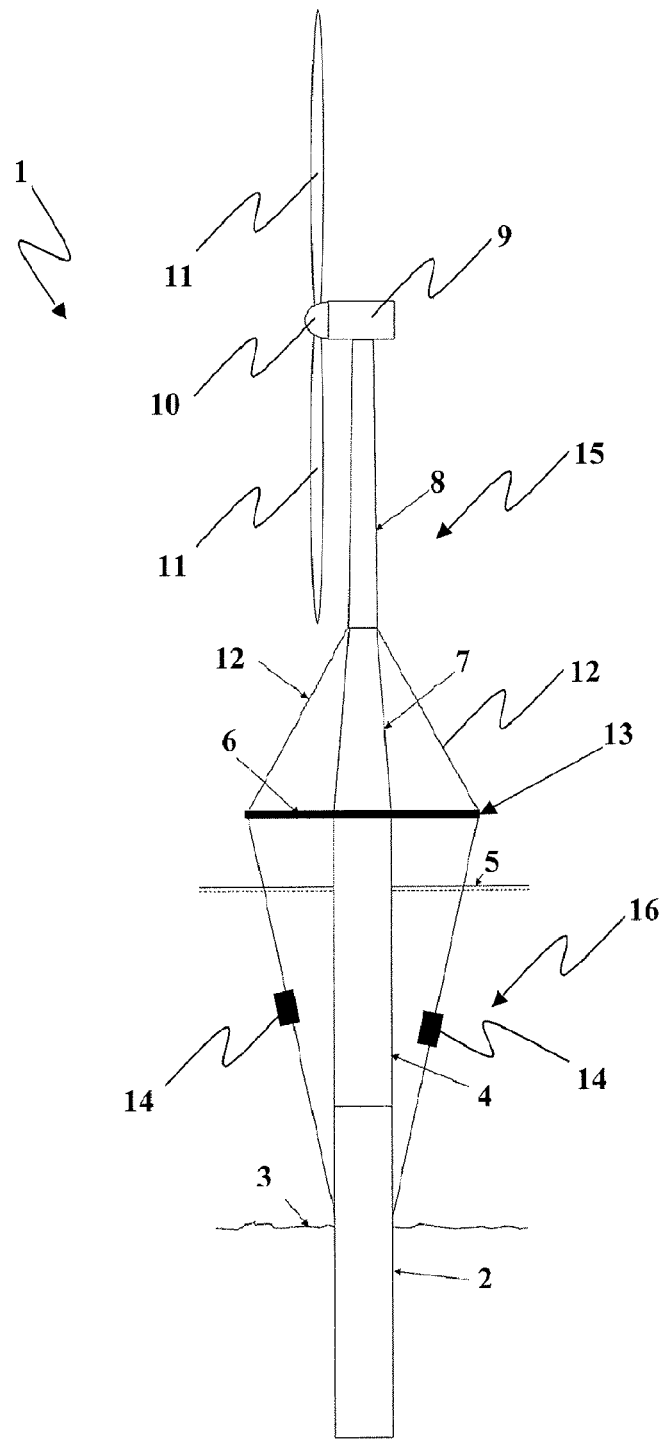
FIG. 1 is a schematic side view of an off-shore wind turbine of the present invention.

FIG. 1 is a schematic side view of an off-shore wind turbine 1 of the present invention which will now be described.

An underwater lower mono-pile section 2 has been driven into the seabed 3, fixing the wind turbine 1 to the seabed 3. On top of the lower mono-pile section 2, an upper mono-pile section 4 is mounted, the upper mono-pile section 4 extending above the water surface 5. At the top of the upper mono-pile section 4, possibly in proximity of a door (not shown) of the tower, a radial distance element 6 in the form of a platform is mounted to the upper mono-pile section 4. Those skilled in the art will appreciate that any type of radial distance element 6 may be used, and that a platform is only one of many possibilities. Those skilled in the art will also appreciate that the platform 6 may be mounted in any other manner so long as it extends outwardly from the mono-pile 16 and the tower 15. The platform 6 encircles the upper mono-pile section 4 and is designed to be able to carry personnel and wind turbine components during, for example, construction and maintenance of the wind turbine 1.

On top of the upper mono-pile section 4, a lower tower section 7 is mounted; and on top of the lower tower section 7, an upper tower section 8 is mounted. On top of the upper tower section 8, a nacelle 9 is mounted, the nacelle being horizontally rotatable. To a vertical side of the nacelle 9, a rotor comprising a hub 10 and rotor blades 11 is rotatably mounted.

A plurality of connecting elements 12, according to this specific embodiment in the form of wires, extend from the tower 15 to the lower mono-pile section 2 via the periphery 13 of the platform 6. The wires 12 may extend from any part of the tower 15, but in the specific embodiment of FIG. 1 they extend from the region at the transition between the lower tower section 7 and the upper tower section 8. The wires 12 may be fastened to the platform 6 at its periphery 13, supporting the platform 6 and thus allowing it to carry a higher weight, but alternatively the wires 12 may bear against the periphery 13 of the platform 6 via pulleys to facilitate tightening and adjusting the wires 12. In FIG. 1, to facilitate the understanding, only two connecting elements 12 are shown, but in reality as many as 40 to 200 connecting elements 12 may be used, conveniently evenly spaced around the tower 15 and mono-pile 16 via the platform 6 to evenly support the tower in all horizontal directions. The number of connecting elements may e.g. depend on the strength of each element and on the size of the tower. Although the connecting elements 12 of FIG. 1 are elongated elements having a first section extending between the tower 15 and the platform 6 and a second section extending between the platform 6 and the lower mono-pile section 2, those skilled in the art will appreciate that other arrangements are possible. For example, the connecting elements 12 may alternatively be a plurality of connecting elements 12 extending from the radial distance element 6 to at least one of the tower 15 and pile 16.

Figure 2:
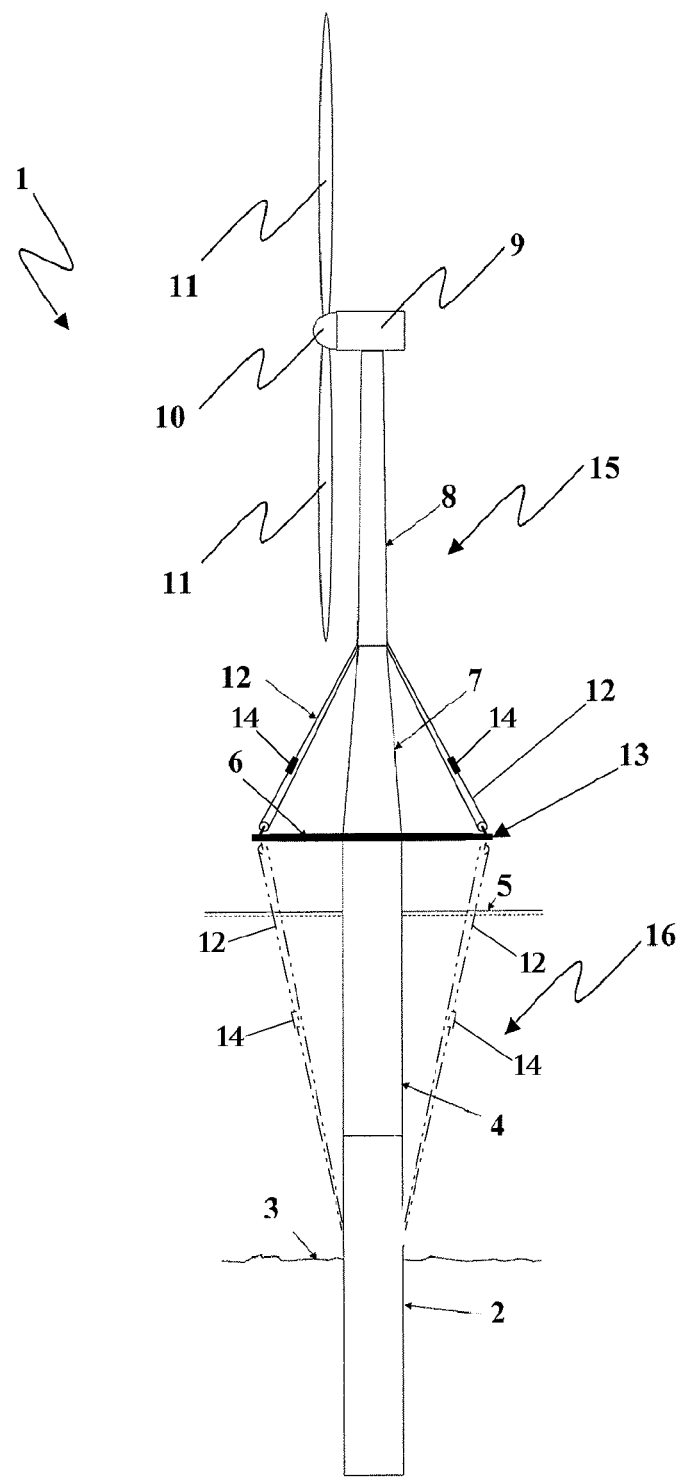
FIG. 2 is a side view of an off-short wind turbine similar to FIG. 1 illustrating an arrangement of connecting elements according to an embodiment of the invention.

FIG. 2 illustrates an arrangement of the connecting elements 12 in accordance with an embodiment of the invention. In this regard, a connecting element 12, for example, a wire or a chain, may be fastened to the tower 15 or the pile 16 at both ends of the connecting element 12, via, for example, a pulley of the radial distance element or platform 6. Thus, a connecting element 6, for example, in the form of a wire, may be fastened to the tower 15 at one wire end, extend down to the radial distance element or platform 6 where it cooperates with a pulley, and then extend back up to the tower 15 where it is fastened at the other wire end. Both wire ends may be fastened at essentially the same place of the tower 15 or they may be fastened at different places of the tower 15, such as at different vertical positions of the tower 15. Analogously, both ends of a connecting element may be fastened to the pile 16.

The wires 12 may comprise rigging screws 14, or any other means for facilitating tightening and adjusting the connecting elements 12, for tightening the wires 12 in order to support and vertically align the tower 15 on the mono-pile 16. The wires 12 may have been tightened by means of the rigging screws 14 prior to being fastened to the platform 6; or the wires 12 may have been tightened after being fastened to the platform 6, in which case it may be convenient to provide two rigging screws per wire 12, one below the platform 6 and one above the platform 6.

As the tower is positioned on the pile, the tower may be supported only by its own weight, pressing it against the pile, and the connecting elements, or it may additionally be connected to the pile via a joint, such as a lap joint or flanges. The joint may be e.g. welded or bolted. Alternatively, a universal joint may be used to facilitate positioning, i.e. vertically aligning, the tower by means of the connecting elements after connecting the tower to the pile via the joint, whereby the tower may be horizontally supported, i.e. held in position, only by the connecting elements.

Any number of connecting elements may be used to support the tower, but for increased stability and homogenous support in all horizontal directions, it may be convenient to use a relatively high number of connecting elements, such as 40 to 200 connecting elements, which may be essentially evenly spaced around the tower and pile or be arranged in some other way to support the tower against forces in all horizontal directions.

As discussed above, the radial distance element may be of any design allowing the connecting elements to be spaced, distanced, from the tower and the pile, such as a platform or radially extending discrete bars. It is thus noted that the radial distance element may be divided into a plurality of discrete sections, or it may form a single structural part.

The radial distance element may be provided, or mounted, on the pile, on the tower or between the pile and the tower, or it might not be mounted to any one of the tower or the pile, only being kept in place by the connecting elements.

It is noted that the tower is positioned on the pile, but need not be in direct contact with the pile. Rather, the tower may be connected to the pile via e.g. a joint or a transition element.

In addition to the tower, pile and connecting elements, the inventive wind turbine may comprise a nacelle mounted on the tower for housing e.g. a gear box and a generator, and a rotor mounted on the nacelle and comprising a hub and a plurality of rotor blades.

The tower of the inventive wind turbine may be divided into a plurality of sections. This may be advantageous if the tower is large since the tower may then be produced and transported as a plurality of separate sections, which sections may then be mounted to each other to form the tower. However, depending on e.g. the size and requirements of the tower, it may be convenient with the tower existing as a single unit not being a divided into sections, to e.g. simplify the tower construction and avoid potentially weak joints in the tower.

If the tower is divided into a plurality of sections, the connecting elements may extend from any one of the sections or from a plurality of the sections, depending on the design and requirements of the wind turbine. Thus, one or several of the connecting elements may extend from one tower section, whereas another or several other connecting elements may extend from another tower section.

Also the pile of the inventive wind turbine may be divided into a plurality of sections with the same advantages as for the tower. Additionally, the fixing of the pile to the seabed may be facilitated by handling the pile in a plurality of longitudinal sections since then only the lowermost pile section may need to be handled when the pile is fixed to the seabed, e.g. by driving the pile section into the seabed or fastening it to other foundation structures standing on the seabed. However, depending on e.g. the size and requirements of the pile, it may be convenient with the pile existing as a single unit not being a divided into sections, to e.g. simplify the pile construction and avoid potentially weak joints in the pile.

If the pile is divided into a plurality of sections, it may be convenient to allow the connecting elements, or at least one of the connecting elements, to extend to a lower pile section for increased stability since forces exerted on the pile via the connecting element will then not strain the joint between the lower pile section and an a higher pile section. However, depending on the design of the wind turbine, the connecting elements, or at least one of the connecting elements, may extend to a higher pile section.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. An off-shore wind turbine comprising:
a tower having a bottom surface,
a pile having a top surface and forming at least part of a foundation carrying the tower,
a radial distance element extending outward from the tower and the pile, and
a plurality of connecting elements extending from the radial distance element to at least one of the tower and pile, the plurality of connecting elements being configured to vertically align the tower on the pile,
wherein the bottom surface of the tower is coupled to the top surface of the pile only by gravity and friction between the bottom and top surfaces, and
wherein the connecting elements include a first end and a second end, each end being coupled to one of the tower and pile at essentially the same place.

2. The off-shore wind turbine of claim 1, wherein at least some of the connecting elements are elongated elements having a first section extending from the radial distance element to the tower and a second section extending from the radial distance element to the pile.

3. The off-shore wind turbine of claim 1, wherein the connecting elements include wires.

4. The off-shore wind turbine of claim 1, wherein the connecting elements slidably bear against the radial distance element.

5. The off-shore wind turbine of claim 4, wherein the connecting elements bear against the radial distance element via pulleys.

6. The off-shore wind turbine of claim 1, wherein the plurality of connecting elements comprises a plurality of upper connecting elements extending from the radial distance element to the tower and a plurality of lower connecting elements extending from the radial distance element to the pile.

7. The off-shore wind turbine of claim 1, wherein the connecting elements extend from a periphery of the radial distance element.

8. The off-shore wind turbine of claim 1, wherein at least one of the plurality of connecting elements comprises a rigging screw.

9. The off-shore wind turbine of claim 1, wherein the radial distance element is positioned in proximity of a transition between the pile and the tower.

10. The off-shore wind turbine of claim 1, wherein the radial distance element is a platform.

11. The off-shore wind turbine of claim 1, wherein the connecting elements are chosen from the group consisting of wires, chains, ropes or a combination thereof.

12. The off-shore wind turbine of claim 1, wherein each of the connecting elements includes a plurality of selectively exchangeable segments coupled to each other, thereby permitting one of the segments to be replaced without replacing the other segments.

13. An off-shore wind turbine comprising:
a tower having a bottom surface,
a pile having a top surface and forming at least part of a foundation carrying the tower,
a radial distance element extending outward from the tower and the pile, and
a plurality of connecting elements extending from the radial distance element to at least one of the tower and pile, the plurality of connecting elements being configured to vertically align the tower on the pile,
wherein the bottom surface of the tower is effectively coupled to the top surface of the pile only by gravity and friction between the bottom and top surfaces, and
wherein the radial distance element is a platform.

14. The off-shore wind turbine of claim 13, wherein at least some of the connecting elements are elongated elements having a first section extending from the radial distance element to the tower and a second section extending from the radial distance element to the pile.

15. The off-shore wind turbine of claim 13, wherein the connecting elements slidably bear against the radial distance element.

16. The off-shore wind turbine of claim 15, wherein the connecting elements bear against the radial distance element via pulleys.

17. The off-shore wind turbine of claim 13, wherein the connecting elements are fixed to the radial distance element.

18. The off-shore wind turbine of claim 13, wherein the plurality of connecting elements comprises a plurality of upper connecting elements extending from the radial distance element to the tower and a plurality of lower connecting elements extending from the radial distance element to the pile.

19. The off-shore wind turbine of claim 13, wherein the radial distance element is positioned in proximity of a transition between the pile and the tower.

20. The off-shore wind turbine of claim 13, wherein each of the connecting elements includes a plurality of selectively exchangeable segments coupled to each other, thereby permitting one of the segments to be replaced without replacing the other segments.

* * * * *